US008756118B1

(12) United States Patent
Bernshteyn et al.

(10) Patent No.: US 8,756,118 B1
(45) Date of Patent: Jun. 17, 2014

(54) SHOPPING AT E-COMMERCE SITES WITHIN A BUSINESS PROCUREMENT APPLICATION

(75) Inventors: Rob Bernshteyn, Foster City, CA (US); Noah Eisner, Menlo Park, CA (US); Graham Melcher, San Francisco, CA (US); David Williams, Oakland, CA (US)

(73) Assignee: Coupa Incorporated, San Mateo, CA (US)

( * ) Notice: Subject to any disclaimer, the term of this patent is extended or adjusted under 35 U.S.C. 154(b) by 292 days.

(21) Appl. No.: 13/253,809

(22) Filed: Oct. 5, 2011

Related U.S. Application Data

(60) Provisional application No. 61/390,246, filed on Oct. 6, 2010.

(51) Int. Cl.
*G06Q 30/00* (2012.01)

(52) U.S. Cl.
USPC .................. 705/26.8; 705/26.1; 705/27.1

(58) Field of Classification Search
USPC ........................ 705/26.1, 27.1, 26.8
See application file for complete search history.

(56) References Cited

U.S. PATENT DOCUMENTS

| | | |
|---|---|---|
| 5,315,504 A | 5/1994 | Lemble |
| 5,319,542 A | 6/1994 | King, Jr. et al. |
| 5,358,278 A | 10/1994 | Ellis |
| 5,433,483 A | 7/1995 | Yu |
| 5,581,691 A | 12/1996 | Hsu et al. |
| 5,758,327 A | 5/1998 | Gardner et al. |
| 5,966,126 A | 10/1999 | Szabo |
| 6,442,515 B1 | 8/2002 | Varma et al. |
| 6,611,807 B1 | 8/2003 | Bernheim et al. |
| 6,876,977 B1 * | 4/2005 | Marks .................. 705/26.62 |
| 6,895,389 B1 * | 5/2005 | Fischburg ............ 705/26.81 |
| 6,968,316 B1 | 11/2005 | Hamilton |
| 7,086,586 B1 | 8/2006 | Sullivan |
| 7,606,750 B1 | 10/2009 | Hoag et al. |

(Continued)

OTHER PUBLICATIONS

"Moving From Traditional Procurement to E-Procurement: An Investigation of the Challenges to Implementation," by Borza, A., Bordean, O., and Mitra, C., Managerial Challenges of the Contemporary Society, Proceedings: 33-37, Cluj-Napoca: Babes Bolyai University, (2009).*

(Continued)

*Primary Examiner* — Jeffrey A Smith
*Assistant Examiner* — Anne Georgalas
(74) *Attorney, Agent, or Firm* — Hickman Palermo Truong Becker Bingham Wong LLP

(57) ABSTRACT

In an embodiment, a method comprises sending, from a procurement computer to a client computer, a message indicating that a pre-authorization request for one or more requested items from an e-commerce website was approved; causing displaying a particular item as approved for purchase from the e-commerce website; causing launching a web browser and causing downloading a shopping cart webpage of the e-commerce website; sending, from the procurement computer to the shopping cart webpage, item information associated with the particular item, and causing displaying the item information on the shopping cart webpage as one of one or more ordered items; in response to determining that the user requested to proceed to a checkout webpage, causing downloading the checkout webpage and causing displaying the one or more ordered items on the checkout webpage; causing placing a purchase order for the one or more ordered items from the checkout webpage.

15 Claims, 10 Drawing Sheets

(56) References Cited

U.S. PATENT DOCUMENTS

| | | |
|---|---|---|
| 7,783,513 B2 | 8/2010 | Lee |
| 8,090,595 B2 | 1/2012 | Hartman |
| 8,195,491 B2 | 6/2012 | Neuberger et al. |
| 2001/0029475 A1 | 10/2001 | Bicourt et al. |
| 2002/0038265 A1 | 3/2002 | Mertz et al. |
| 2002/0046187 A1 | 4/2002 | Vargas et al. |
| 2002/0065736 A1* | 5/2002 | Willner et al. .................. 705/26 |
| 2002/0091991 A1 | 7/2002 | Castro |
| 2002/0123949 A1 | 9/2002 | VanLeeuwen |
| 2002/0130868 A1 | 9/2002 | Smith |
| 2004/0135805 A1 | 7/2004 | Gottsacker et al. |
| 2005/0114829 A1 | 5/2005 | Robin et al. |
| 2005/0262014 A1 | 11/2005 | Fickes |
| 2005/0289025 A1 | 12/2005 | Fredericks et al. |
| 2006/0085309 A1 | 4/2006 | Tamura |
| 2006/0143089 A1* | 6/2006 | Jain et al. ........................ 705/21 |
| 2006/0218087 A1 | 9/2006 | Zimmerman |
| 2006/0282380 A1 | 12/2006 | Birney et al. |
| 2007/0038566 A1* | 2/2007 | Shestakov et al. .............. 705/44 |
| 2007/0156512 A1 | 7/2007 | Yerkie |
| 2009/0182592 A1* | 7/2009 | Ballaro et al. .................... 705/7 |
| 2009/0313598 A1 | 12/2009 | Donaldson |
| 2010/0076812 A1 | 3/2010 | Ghosh et al. |
| 2010/0228680 A1 | 9/2010 | Neuberger et al. |
| 2011/0178897 A1* | 7/2011 | Balasubramanian et al. ............................ 705/27.1 |
| 2012/0066030 A1 | 3/2012 | Limpert |

OTHER PUBLICATIONS

United States General Accounting Office, "Report to Congressional Committees, Acquisition Reform, Purchase Card Use Cuts Procurement Costs, Improves Efficiency", B-271689, Dated Aug. 6, 1996, 22 pages.

U.S. Appl. No. 13/253,815, filed Oct. 5, 2011.

U.S. Appl. No. 13/253,755, filed Oct. 5, 2011.

* cited by examiner

SHOPPING AT E-COMMERCE SITES WITHIN A BUSINESS PROCUREMENT APPLICATION

BENEFIT CLAIM

Cross-Reference to Related Applications

This application claims the benefit under 35 U.S.C. 119(e) of provisional application 61/390,246, filed Oct. 6, 2010, the entire contents of which are incorporated by this reference for all purposes as if fully set forth herein.

This application is related to U.S. patent application Ser. No. 13/253,815, filed Oct. 5, 2011, entitled Cross-Enterprise Metric Comparisons For Business Procurement Applications, by inventors Rob Bernshteyn, Noah Eisner, Graham Melcher, David Williams.

This application is related to U.S. patent application Ser. No. 13/253,755, filed Oct. 5, 2011, entitled Monitoring Expenses Deviations In A Business Procurement Application, by inventors Rob Bernshteyn, Noah Eisner, Graham Melcher, David Williams.

TECHNICAL FIELD

The present disclosure is generally related to enterprise business applications, and specifically relates to enabling e-commerce shopping in conformance with constructs imposed by a business procurement system.

BACKGROUND

E-commerce shopping provides convenience and expediency. Using e-commerce websites, customers can conveniently browse through vast collections of goods, easily place purchase orders and efficiently complete purchasing transactions.

However, in a corporate environment, purchasing goods by a company is often regulated and can require obtaining an approval from authorized personnel before a purchase order can actually be placed with an e-commerce website. For example, purchasing a requested item from an e-commerce website can require a pre-authorization before the requested item can be actually ordered from the e-commerce website.

A pre-authorization requirement is often necessitated by various policies implemented in a company procurement system. For example, many companies require that only designated individuals can actually place purchase orders on behalf of the company, or that only certain goods can be purchased using the company funds.

Obtaining a pre-authorization before ordering a requested item from an e-commerce website can often be a time-consuming and inefficient process. For example, it can require entering information about the requested item to a pre-authorization request, submitting the request for review, and waiting until a pre-authorization decision is made. Once a pre-authorization confirmation is received, the same information about the requested item needs to be entered to an e-commerce website to complete and place a purchase order.

Hence, corporate e-commerce shopping often requires entering the same type of information about a requested item twice: the first time while a pre-authorization request is generated, and again while an actual purchase order is placed with an e-commerce website. Retyping the same type of information about the requested item, e-commerce vendor or other information can be time consuming and inconvenient.

DESCRIPTION OF EXAMPLE EMBODIMENTS

Figure 1:
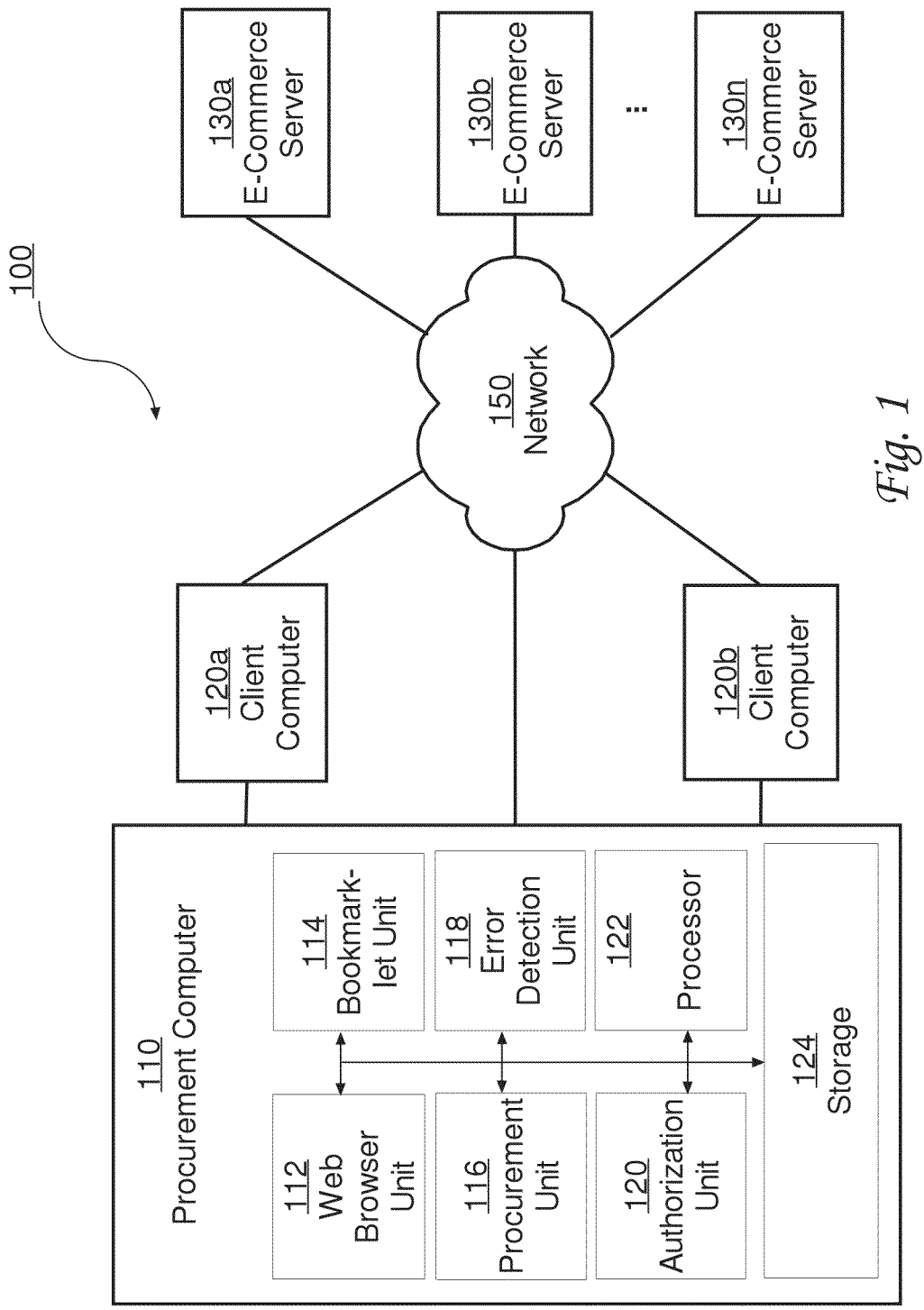
FIG. 1 illustrates an embodiment of a data processing system configured to enable e-commerce shopping within a business procurement application.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Example of Enabling E-commerce Shopping Using a Business Procurement System
4.0 Example of Enabling E-commerce Shopping Using a Business Procurement System
5.0 Example of Enabling E-commerce Shopping Using a Business Procurement System
6.0 Examples of Tabs Implemented in a Business Procurement Application
7.0 Implementation Mechanisms—Hardware Overview
8.0 Extensions and Alternatives 1.0 Overview In an embodiment, a data processing system, method and computer program are presented for enabling shopping at e-commerce sites within a business procurement application. The presented approach simplifies the processes of selecting items from an e-commerce website, obtaining a purchase pre-authorization from a company management, and placing a purchase order with the e-commerce website to purchase the items.

In an embodiment, a data processing system, method and computer program are implemented in a procurement computer.

In an embodiment, a procurement computer provides a bookmarklet code (bookmark implemented in an applet) that allows transferring information about items selected for purchase from an e-commerce website to a procurement computer. For example, as an e-commerce shopper selects the items for purchase from an e-commerce website, the procurement computer can facilitate transferring the information about the items from the e-commerce website to the procurement computer to assist in generating a pre-authorization request. The information about the requested items can be transferred from the e-commerce website to the procurement computer with little or none assistance from a shopper.

Furthermore, a procurement computer allows receiving a pre-authorization request for a purchase of the requested items, communicates the pre-authorization request to authorized personnel, and upon receiving a pre-authorization request approval, assists in transferring the information about the requested items to a shopping cart webpage of the e-commerce website.

In an embodiment, information about requested items is transferred from an e-commerce website to a procurement computer automatically or semi-automatically. For example, all or most of the information about the requested item can be automatically derived by the procurement computer from the e-commerce web site, making the information transfer efficient and simple. However, if some information is missing or misrepresented, then that information can be added or updated manually. Nevertheless, manual entry of information, if any, is rare and infrequent.

In an embodiment, upon receiving a pre-authorization request for a purchase of requested items, a procurement computer communicates a pre-authorization request to authorized personnel. For example, the pre-authorization request can be send as any type of message (email, voice-mail, or other) to a designated manager or a designated employee who has the authority to approve the pre-authorization requests.

In an embodiment, upon receiving a pre-authorization request approval, a procurement computer sends the pre-authorization request approval to either a shopper who submitted the pre-authorization request or to designated personnel who is authorized to place an actual purchase order for the requested items via an e-commerce website.

Regardless of whether a pre-authorization request approval is communicated to a shopper who submitted a pre-authorization request or to designated personnel, a procurement computer can assist in placing an actual purchase order for requested items on the e-commerce website. For example, once the shopper receives the pre-authorization request approval, launches a web browser and downloads a shopping cart webpage of the e-commerce website, the procurement computer can assist in filling out information in the shopping cart webpage. For example, the procurement computer can send, from storage of a procurement computer to the shopping cart webpage of the e-commerce website, item information associated with the requested items. Furthermore, the procurement computer can cause displaying the item information on the shopping cart webpage as ordered items.

In an embodiment, in response to determining that a shopper requested to proceed to a checkout webpage of an e-commerce website, a procurement computer causes downloading a checkout webpage of the e-commerce website and causes displaying the one or more ordered items on the checkout webpage of the e-commerce website.

In an embodiment, all or most of required information about the ordered items can be transferred to a checkout webpage of an e-commerce website. However, if some of the required information is missing or is misrepresented, that information can be updated or corrected manually by a shopper.

In an embodiment, a procurement computer causes placing a purchase order for one or more ordered items from a checkout webpage of the e-commerce website.

In an embodiment, item information associated with a particular item comprises one or more of: a name of the particular item, a quantity of the particular item to be purchased, one or more specific attributes associated with the particular item, billing information for the particular item; shipping information for the particular item, user login information and any other type of information.

In an embodiment, a procurement computer receives an order confirmation once a purchase order for one or more ordered items was successfully processed by an e-commerce website.

In an embodiment, a method comprises steps corresponding to the processes described herein.

In an embodiment, a non-transitory computer-readable storage medium stores one or more sequences of instructions which, when executed by one or more processors, cause the one or more processors to perform the processes described herein.

2.0 Structural and Functional Overview

FIG. 1 illustrates an embodiment of a data processing system configured to enable e-commerce shopping within a business procurement application. In an embodiment, the data processing system 100 comprises a procurement computer 110, one or more client computers 120a, 120b, a network 150 and one or more e-commerce servers 130a, 130b . . . 130n.

Procurement computer 110 can be implemented in a separate computer or server, or can be a part of a data procurement system or a data procurement application. In an embodiment, procurement computer 110 can be implemented in one or more business procurement servers.

In an embodiment, procurement computer 110 executes one or more software applications. In one implementation, the procurement computer 110 executes the "Procurement" application from Coupa, Inc., San Mateo, Calif.

In an embodiment, procurement computer 110 communicates with one or more client computers 120a, 120b, and with one or more e-commerce servers 130a, 130b . . . 130n via a communications network 150.

For purposes of illustrating clear examples, FIG. 1 shows one or more client computers 120a, 120b, one or more e-commerce servers 130a, 130b . . . 130n and one network 150. However, practical embodiments may use any number of client computers 120, any number of e-commerce servers 130 and any number of networks 150.

In an embodiment, network 150 is communicatively coupled to client computers 120a, 120b, e-commerce servers 130a, 130b . . . 130n, and procurement computer 110. Network 150 is used to maintain various communications sessions and may implement one or more communications protocols.

Each client computer 120a, 120b, each e-commerce server 130a, 130b . . . 130n and procurement computer 110 can be any type of a workstation, laptop, PDA device, phone, or a portable device.

Client computers 120a, 120b, e-commerce servers 130a, 130b . . . 130n and procurement computer 110 may implement the processes described herein using hardware logic such as in an application-specific integrated circuit (ASIC), field-programmable gate array (FPGA), system-on-a-chip (SoC) or other combinations of hardware, firmware and/or software.

In an embodiment, client computers 120a, 120b, e-commerce servers 130a, 130b . . . 130n, procurement computer 110 and network 150 comprise hardware or software logic configured to generate and maintain various types of communications session information, and routing information for data communications network 150.

In an embodiment, client computers 120a, 120b can be proprietary computers of one company. Alternatively, client computer 120a can belong to one company, while client computer 120b can belong to another computer. If there are more than two client computers 120, then the client computers 120 can belong to two or more companies.

In an embodiment, e-commerce servers 130a, 130b . . . 130n serve e-commerce websites. E-commerce websites can provide graphical user interfaces for conducting electronic-commerce shopping. Examples of such websites can include Amazon.com™, eBay.com™, FreshDirect.com™, Peapodand.com™ and others. Access to the e-commerce websites can be restricted and may require providing valid user credentials.

In an embodiment, from any client computer 120a, 120b, a shopper can request access to any e-commerce server 130a, 130b . . . 130n, and initiate e-commerce shopping from any e-commerce server 130a, 130b . . . 130n. For example, from client computer 120a, a shopper can launch an e-commerce webpage of the website serviced by e-commerce server 130a, select one or more requested items that the shopper would like to purchase for his company, and then launch a procurement application to request a pre-authorization.

Alternatively, from any client computer 120a, 120b, a shopper can access a procurement computer 110, launch a procurement application, and then, from the procurement application, the shopper can access an e-commerce website served by any e-commerce server 130a, 130b . . . 130n.

Access to a procurement application can be restricted and can require providing valid user credentials before a shopper can use the procurement application. For example, a shopper may have to enter valid user login identification and a valid user password.

In an embodiment, before a shopper can actually place a purchase order via a checkout webpage of an e-commerce website, a shopper prepares a pre-authorization request and sends the pre-authorization request from client computer 120a to a procurement computer 110. The process of pre-authorizing the e-commerce shopping and placing a purchase order from an e-commerce website can be monitored and supervised by a procurement computer 110.

In an embodiment, once a pre-authorization request to place an order for one or more requested items is approved and the approval is received at client computer 120a, a shopper can proceed with a purchasing order. For example, a shopper can launch a web browser on a client computer 120a, and downloads a shopping cart webpage of an e-commerce website. Furthermore, from client computer 120a, the shopper can initiate a transfer of detailed information about the requested items from storage associated with a procurement computer 110 to the shopping cart of the e-commerce website served by an e-commerce server 130a.

In an embodiment, from client computer 120a, a shopper launches a checkout webpage of an e-commerce website and proceeds to the checkout to place an actual purchase order with the e-commerce website.

In an embodiment, a procurement computer 110 monitors and facilitates e-commerce shopping. For example, procurement computer 110 can facilitate communications between an employee of a company who wants to purchase an item for the company and the company management that is authorized to approve such purchase requests.

In an embodiment, a procurement computer 110 monitors selection of requested items from e-commerce websites by the company employees. Furthermore, procurement computer 110 can facilitate a pre-authorization of a purchase of the requested items and assists in placing a purchase order with the e-commerce website if the pre-authorization was successful.

In an embodiment, a procurement computer 110 comprises a web browser unit 112, a bookmarklet unit 114, a procurement unit 116, an error detection unit 118, an authorization unit 120, and a processor 122. Procurement computer 110 can also comprise a storage unit 124 for storing information about requested items, ordered items, pre-authorization requests, approvals, confirmations, and any other information that procurement computer 110 may require.

Although FIG. 1 depicts only one module for each of the above listed units, more than one modules of each kind can be included in procurement computer 110.

In an embodiment, a processor 122 facilitates communications between procurement computer 110, client computers 120a, 120b and e-commerce servers 130a, 130b . . . 130n. Furthermore, processor 122 can process commands received and executed by procurement computer 110, processes responses received by procurement computer 110, and facilitates various types of operations executed by procurement computer 110. Processor 102 comprises hardware and software logic configured to execute various processes on procurement computer 110.

In an embodiment, a web browser unit 112 is configured to cause launching a web browser on any of client computers 120a, 120b. For example, a web browser unit 112 can be configured to receive a request to launch on a client computer 120a an e-commerce website serviced by an e-commerce server 130a, and upon receiving such a request, web browser unit 112 can launch on client computer 120a the e-commerce website from the e-commerce server 130a.

In an embodiment, a web browser unit 112 is further configured to cause downloading a shopping cart webpage of the e-commerce website served by an e-commerce server 130a on a client computer 120a. The shopping cart webpage can be downloaded in response to determining that a shopper requested to proceed to a shopping cart webpage.

In an embodiment, a web browser unit 112 is further configured to cause downloading a checkout webpage of the e-commerce website served by an e-commerce server 130a on a client computer 120a. The checkout webpage can be downloaded in response to determining that a shopper requested to proceed to the checkout.

In an embodiment, a bookmarklet unit 114 is configured to execute a bookmarklet code on a procurement computer 110. A bookmarklet is a bookmark implemented in an applet code. Execution of the bookmarklet allows transferring information about items selected for purchase between an e-commerce website and a procurement computer 110. For example, as an e-commerce shopper selects an item for purchase from an e-commerce website, bookmarklet unit 114 can transfer the information about the items from the e-commerce web site to storage 124 of procurement computer 110 to facilitate a purchase pre-authorization.

In an embodiment, information about a requested item can be transferred from a page of an e-commerce website to storage 124 of the procurement computer 110 with little or none assistance from the shopper. For example, when executed, a bookmarklet code can cause analyzing content of the webpage, scan textual information displayed on the webpage, scan pictorial information displayed on the webpage and acquire any other information that helps describing the requested item.

In an embodiment, item information associated with a requested item comprises one or more of: a name of the particular item, a quantity of the particular item to be purchased, one or more specific attributes associated with the particular item, billing information for the particular item; shipping information for the particular item, and user login information.

In an embodiment, a bookmarklet unit 114 is further configured to cause transferring the information about the requested items from storage 124 of procurement computer 110 to a shopping cart webpage of the e-commerce website served by an e-commerce server 130a.

In an embodiment, a bookmarklet unit 114 is further configured to cause transferring information about one or more requested items from a shopping cart of the e-commerce website served by an e-commerce server 130a to a checkout page of the e-commerce website, and to cause displaying that information as data for one or more ordered items on the checkout webpage of the e-commerce website.

In an embodiment, a bookmarklet unit 114 is further configured to cause transferring information about a purchase order and a purchase order confirmation from a webpage displayed by an e-commerce server 130a to storage 124.

In an embodiment, an authorization unit 120 is configured to receive an authentication and/or authorization request from a client computer 120a to launch a procurement application from a procurement computer 110. For example, authorization unit 120 can receive a request from client computer 120a, indicating that, from client computer 120a, a shopper would like to launch the procurement application to submit a pre-authorization request, check a status of a previously submitted pre-authorization request, or for any other purpose.

In an embodiment, an authorization unit 120 is further configured to receive a pre-authorization request to purchase one or more requested items and communicate the pre-authorization request to a company management or designated personnel. The pre-authorization request can be communicated via various communication media. For example, the pre-authorization request can be a message sent via email, voicemail, or any other media.

In an embodiment, an authorization unit 120 is further configured to receive a pre-authorization decision from a company management or designated personnel. For example, authorization unit 120 can receive a message indicating that a pre-authorization request, submitted by a shopper from client computer 120a, was successfully approved by the management, and that the shopper can proceed to place a purchase order for the requested items with an e-commerce server 130a.

Alternatively, an authorization unit 120 can receive a message indicating that a pre-authorization request, submitted by a shopper, was rejected by a company management, and thus the shopper cannot purchase the requested items on behalf of the company.

In an embodiment, a procurement unit 116 is configured to execute a procurement application for a procurement department in a company. For example, procurement unit 116 can execute a procurement application for managing company orders, company finances, company performance data, and other management-related tasks.

In an embodiment, a procurement unit 116 is configured to facilitate receiving a pre-authorization request for a purchase of one or more requested items and to communicate the pre-authorization request to authorized personnel. For example, procurement unit 116 can be configured to automatically review a purchase request, and to determine whether the items requested by a shopper are properly listed in the purchase request, or to determine whether, as listed in the purchase request, the items requested by the shopper are associated with proper categories. Furthermore, procurement unit 116 can be configured to determine, based on information provided by a company logistics department, whether a purchase of a particular item is necessary, or whether a purchase of a particular item is recommended by the company management. Moreover, procurement unit 116 can be configured to perform other task related to executing procurement policies of the company.

In an embodiment, an error detection unit 118 is configured to detect whether any error has occurred during the process of shopping at e-commerce websites within a business procurement application. For example, error detection logic 118 can be configured to determine whether authorization of a shopper using a client computer 120a was successful, whether a business procurement application was successfully launched on client computer 120a, whether a website served by an e-commerce server 130a was successfully launched on client computer 120a, or whether a shopper submitted a valid purchase request to procurement computer 110. Error detection logic 118 can also perform other tests and analysis.

3.0 Example of Enabling E-Commerce Shopping Using a Business Procurement System

Figure 2:
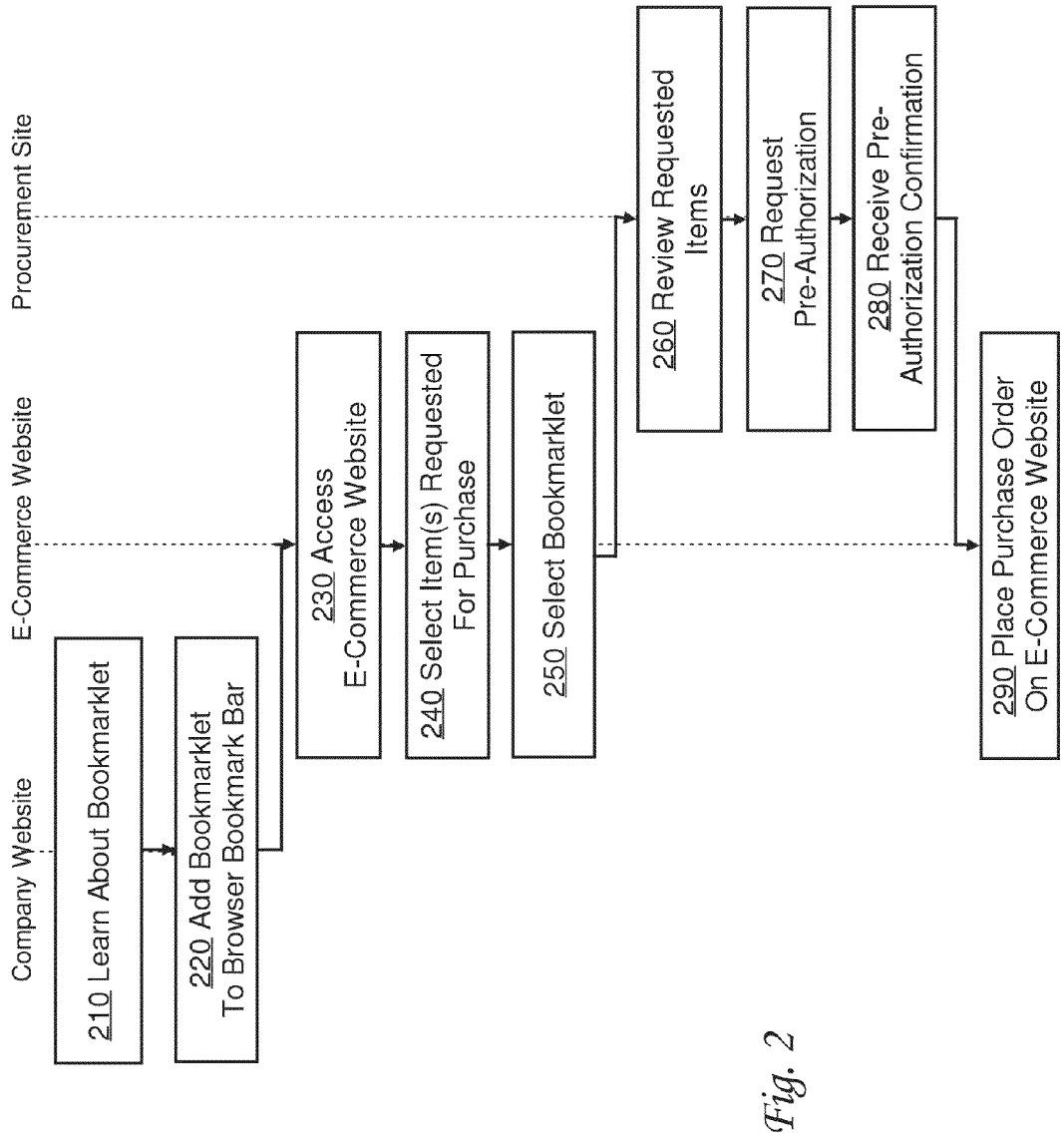
FIG. 2 illustrates an embodiment of enabling e-commerce shopping within a business procurement application from a shopper perspective.

FIG. 2 illustrates an embodiment of enabling e-commerce shopping within a business procurement application from a shopper perspective. A shopper can be a company employee who is attempting to purchase one or more items on behalf of the company.

In an embodiment, a purchase on behalf of the company is regulated by the company policies, and requires a pre-authorization before it can be actually placed with a supplier. Therefore, a shopper (an employee of the company) may be required to seek a pre-authorization of his purchase request before the shopper can actually place an order with the supplier.

In an embodiment, an approach illustrated in FIG. 2 is designed to interface a shopping at e-commerce websites with a purchase pre-approval process implemented by a company in for example, a procurement computer 110.

In an embodiment, steps 210-220 are executed as a company employee explores a company website, a company procurement website, or any other browser-driven application available to the company employees.

In step 210, a company employee learns about the company purchasing tools and implementation of the company purchase polices. For example, the employee can learn that the company is using bookmarklets to transfer data between e-commerce websites and the company procurement application. In particular, the employee can learn about the functionalities of the bookmarklets, accessibility of bookmarklets, and usage of the bookmarklets. The employee can learn about the bookmarklets by launching a web browser and accessing a company website, or a procurement webpage available via the company website.

A bookmarklet can be a Uniform Resource Locator (URL) or a JavaScript program code. A bookmarklet can be stored as a bookmark in a web browser. Bookmarklet-based utilities, stored as bookmarks or hyperlinks, are usually designed to add one-click functionality to a browser or web page. When clicked, a bookmarklet can perform one or more functions, such as executing of a search query, transferring data, or data extraction.

While other bookmarklet-based applications are designed to store content of a web page, the bookmarklet designed to interface with a business procurement application can be configured to process a work flow to complete a purchase order. The work flow can include routing a purchase order through an approval process, and store the information necessary to execute the purchase order.

In step 220, a company employee adds a bookmarklet to his browser. For example, the bookmarklet can be added to a browser bookmark bar.

In an embodiment, an icon corresponding to a particular bookmarklet can be displayed on a page generated by a web browser, or displayed in a menu tab of the web page. If the icon is selected in the future, then the web browser can execute a JavaScript program code associated with the icon of the bookmarklet.

In an embodiment, upon launching, from a web browser, a JavaScript program code associated with a bookmarklet, the JavaScript code is executed in the context of the current web page displayed by the web browser. For example, a JavaScript code of a particular bookmarklet can be used to modify a current page displayed by the web browser.

Furthermore, a JavaScript code of a particular bookmarklet can be used to collect information displayed on a current web page. Moreover, a JavaScript code can be used to process information displayed on the current web page, including sorting the information, reorganizing the information and rearranging the information.

In an embodiment, a bookmarklet is used to interface with a business procurement application. The bookmarklet can be executed in the context of the procurement application to interface between a shopping process facilitated by an e-commerce website and an order placing facilitated by an e-commerce website.

In an embodiment, a bookmarklet facilitates back-end operations related to selecting one or more requested items from an e-commerce website, authenticating and/or authorizing a requester to purchase the requested items from the e-commerce website, submitting the authorized order to the e-commerce website, and other e-commerce shopping-related tasks.

In an embodiment, a bookmarklet enables actual purchasing of a requested item from an e-commerce website.

In an embodiment, steps 230-250 are executed as a company employee explores an e-commerce website.

In step 230, a company employee (a shopper) accesses an e-commerce website. The shopper can access the e-commerce website by launching a Web browser, or by following a hyperlink displayed by for example, a procurement application.

In step 240, a shopper engages in an e-commerce shopping. For example, the shopper can browse a product catalog displayed by an e-commerce website, explore information about various products, select one or more requested products from the e-commerce website, place one or more requested products in a "wish list" of the e-commerce website, or perform any other actions with respect to the e-commerce shopping.

In step 250, a shopper selects a bookmarklet. As described above, a bookmarklet can be displayed in a browser bookmark bar. By selecting the bookmarklet, the shopper can initiate execution of a code associated with the bookmarklet. For example, execution of the bookmarklet can cause launching a company procurement application, transferring information about one or more requested products from an e-commerce webpage to a display generated by the procurement application, storing the transferred information in storage associated with the procurement application, and perform any other procurement-related functions.

In an embodiment, step 260-280 are performed on a procurement site. For example, the step 260-280 can be executed by a procurement application that drives a procurement website. Access to the procurement website may require providing valid user credentials.

In step 260, a shopper can review a display of the requested items generated by a procurement application. The shopper can determine whether all required information about the requested items is properly displayed, or whether any information about the requested items is missing. If some information is missing or mistyped, the shopper can correct the errors, and enter missing information manually. Furthermore, the shopper can delete some information, add some information or in any other way modify the information about the requested items.

In step 270, a shopper requests a pre-authorization for the requested items. For example, the shopper can select a hyperlink displayed by a procurement application to request the pre-authorization for the requested items.

In an embodiment, in response to receiving the request, a bookmarklet of a procurement application can generate an actual pre-authorization request, transfer the information about the requested items into the pre-authorization request and submit the pre-authorization request to a company management.

In step 280, a shopper receives a pre-authorization confirmation to purchase the requested items on behalf of the company. For example, a shopper can receive an email indicating that the confirmation is available for viewing on a procurement website, and thus the shopper can login to the procurement website, review the confirmation and proceed with a purchase of the requested items. To place a purchase, the shopper may have to access an e-commerce web site.

In an embodiment, step 290 is performed once a shopper accesses an e-commerce website.

In step 290, a shopper accesses an e-commerce website and places a purchase order for one or more requested items. In an embodiment, the shopper does not have to enter information about the requested items into a shopping cart webpage of an e-commerce website or a checkout webpage of the e-commerce website. That information can be automatically transferred from a procurement computer to the appropriated webpage of the e-commerce website by a procurement application. For example, by executing a bookmarklet, as described above, the details about the requested items, that the shopper selected in step 240 (above) can be automatically transferred to for example, the checkout webpage of the e-commerce website.

4.0 Example of Enabling E-Commerce Shopping Using a Business Procurement System

Figure 3:
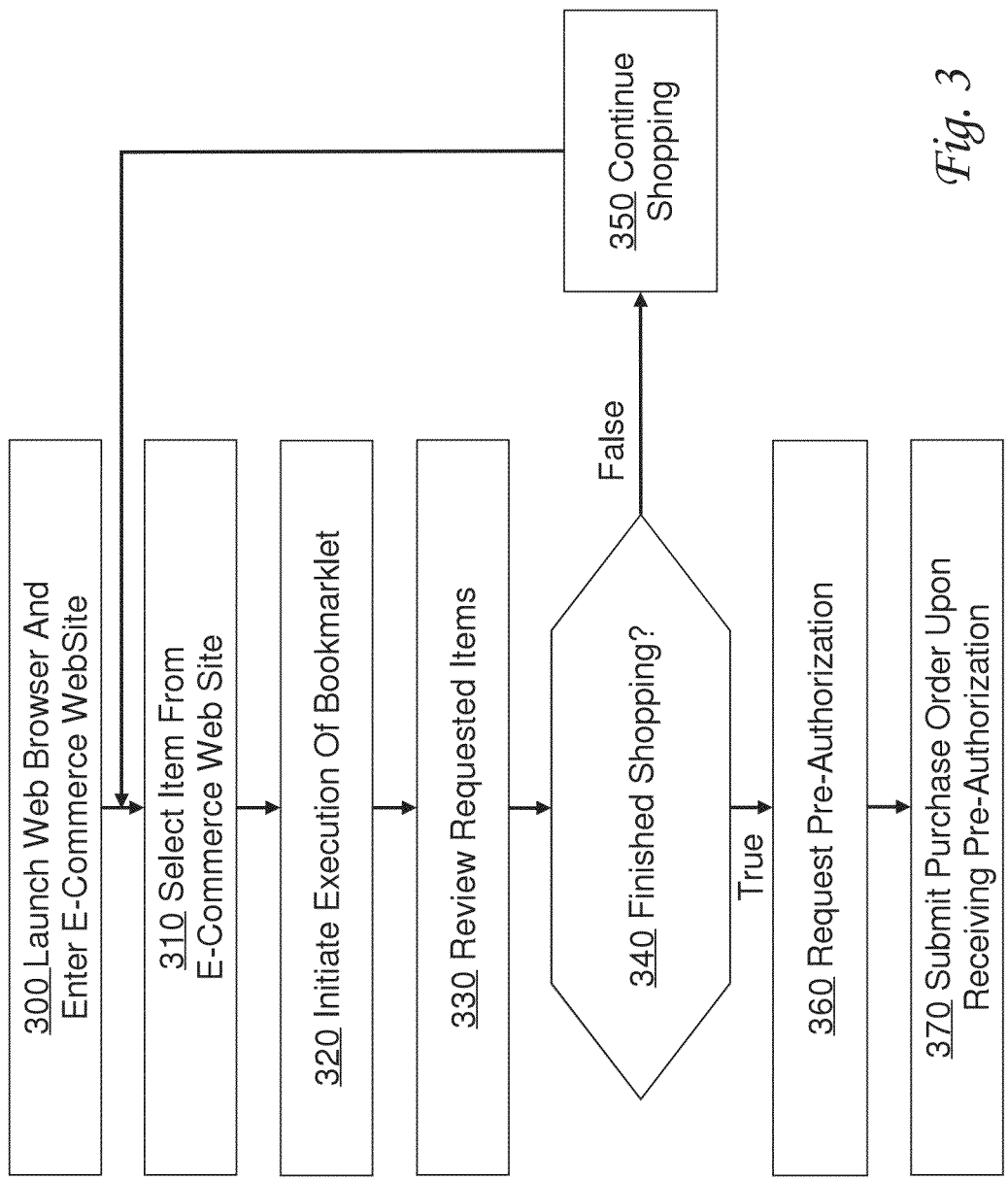
FIG. 3 illustrates an embodiment of enabling e-commerce shopping within a business procurement application from a shopper perspective.

FIG. 3 illustrates an embodiment of enabling e-commerce shopping within a business procurement application from a shopper perspective.

In step 300, a company employee (a shopper) launches a web browser and accesses an e-commerce website to select one or more requested items that the shopper would like to purchase for his company. The shopper access the e-commerce website directly by launching a web browser, or by accessing the e-commerce website from a procurement website generated by a procurement application.

In step 310, a shopper browses an e-commerce website and selects one or more requested items that the shopper would like to purchase for his company. For example, the shopper can browse an e-commerce website, browse product lists provided by the e-commerce website, select one or more items from the product list and indicate that the one or more items are requested for purchase.

In step 320, a shopper initiates execution of a bookmarklet. Depending on the implementation, a bookmarklet can be displayed on a desktop of the shopper's computer, on a browser bookmark bar, or on other place dedicated to the bookmarklet.

In an embodiment, requesting execution of a bookmarklet causes launching a display (a window) of a procurement application or any other application designed to manage e-commerce shopping for a company. The display can be generated from the information displayed on the e-commerce webpage. For example, a bookmarklet can cause transferring the information displayed on the e-commerce website to the procurement application display. The transferred information can include information about one or more requested items, details about the requested items, the e-commerce website from which the items are requested, the name of the shopper, and any other information that the bookmarklet can derive from the e-commerce website and the shopper.

In step 330, a shopper reviews a display of the requested items in a window generated by a procurement application. In an embodiment, a display (a window) generated by a procurement application contains all or some of the information captured from an e-commerce website and pertaining to details of the requested items. If any information is missing, a shopper can add the missing information. The information displayed in the display can be transferred to storage associated with a procurement computer.

In an embodiment, if as shopper has not been authenticated into a company procurement system, a procurement system will request that the shopper provides valid user credentials before the display is generated by a procurement application for the shopper.

In step 340, a shopper decides whether he finished shopping using an e-commerce website, or whether he wishes to continue with the e-commerce shopping. If the shopper finished the shopping, then the process proceeds to step 360. Otherwise, the process proceeds to step 350, in which the shopper continues with the e-commerce shopping.

In step 350, a shopper continues shopping. The shopper can be redirected to a web page from which the shopper launched a bookmarklet, so that the shopper can continue shopping using the e-commerce website. Redirecting the shopper to a particular web page can be implemented by storing the URL associated with the web page from which the shopper launched the bookmarklet last time. Alternatively, redirecting the shopper to a particular web page can utilize an online-store-approach, in which a login information (login identifier and password for the shopper) for a particular e-commerce website can be stored and used to redirect the shopper to the particular e-commerce website. In this approach, an e-commerce website can have a shopper profile created and stored on a procurement system site to include various types of information related to the shopper. The profiles can be updated, modified and deleted by the procurement system, an administrator or the shopper. This can provide an efficient way for facilitating shopping from e-commerce websites.

In step 360, a shopper requests a pre-authorization for a purchase of one or more requested items. Generating the pre-authorization request can be performed automatically and without involving the shopper. For example, a bookmarklet can be executed to generate and send a pre-authorization request. The bookmarklet can generate a request, copy details about the requested items, and any additional information that may be required for a company management to determine whether the requested items can be purchased, and send the request to the company management.

In step 370, upon receiving a pre-authorization to purchase one or more requested items, a shopper is redirected to an e-commerce webpage and prompted to place a purchase order for one or more requested items.

In an embodiment, details about the requested items can be transferred by a procurement application from storage associated with a procurement system to a shopping cart webpage displayed by an e-commerce website. If any detail about the requested item is missing, then the shopper can enter that detail to the shopping cart webpage manually.

In an embodiment, details about the requested items are transferred by a procurement application from storage associated with a procurement system to a checkout cart web page displayed by an e-commerce website. A shopper can complete a checkout processes from the checkout cart web page, enter any missing information, and submit a purchase order to the e-commerce website.

5.0 Example of Enabling E-Commerce Shopping Using a Business Procurement System

Figure 4:
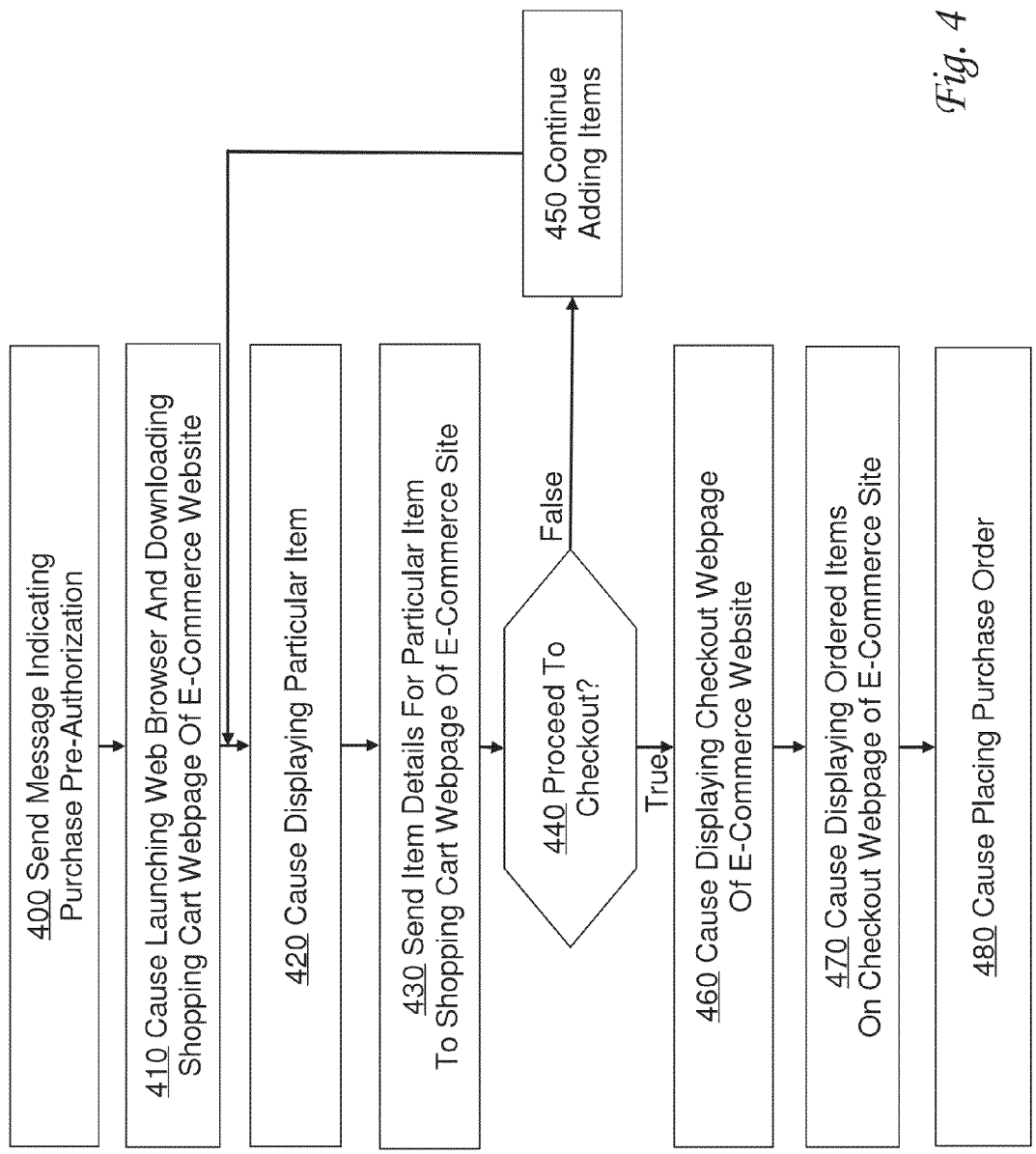
FIG. 4 illustrates an embodiment of enabling e-commerce shopping within a business procurement application.

FIG. 4 illustrates an embodiment of enabling e-commerce shopping within a business procurement application from a procurement application perspective.

In step 400, a procurement system sends a message to a shopper (or a person designated to make purchases for the company) to indicate that a requested purchase has been pre-authorized by the company management. The message can be sent via various media, such as an email, a voice message, or any other form. In an embodiment, the shopper receives a notification alter displayed on a desktop, or any display generated by a web browser or any other application.

In step 410, a procurement system causes launching a web browser on a desktop of a shopper and causes downloading a shopping cart webpage of an e-commerce website. For example, once a user clicks on a link in a notification alert, described in step 400, or navigates to a business procurement application, which can display a link to the shopping cart webpage of the e-commerce website, the procurement system can launch the web browser and download the shopping cart webpage for the shopper. Other methods of launching the shopping cart webpage are also contemplated.

In step 420, a procurement system causes displaying a particular item requested by a shopper. For example, once the shopper selected a notification link and a shopping cart webpage was displayed for the shopper, the procurement system can display the first item requested by the shopper. To accomplish that, the procurement system can transfer the item information from storage associated with the procurement system.

In step 430, a procurement system sends details about a particular item to a shopping cart webpage of an e-commerce website. For example, the procurement system can transfer a particular item details from storage associated with a procurement system to the shopping cart webpage of the e-commerce website. If some information is missing, the shopper can enter the missing information manually. The in shopping cart webpage, the shopper should be able to see details about the particular item, including the name of the particular item, the quantity to be ordered, the price to be paid, the name of the e-commerce site from which the particular item is being ordered, and other information.

In step 440, a procurement system monitors whether a shopper requested to proceed to a checkout webpage, or to continue adding items to a shopping cart webpage. For example, in step 450, a shopper can continue with adding additional requested items to the shopping cart webpage, and the procurement system can continue transferring item details from storage of the procurement system to the shopping cart webpage. The process can be repeated until a request to proceed to a checkout is received.

In step 460, a procurement system monitors displaying a checkout webpage of an e-commerce website. Details about the requested items are transferred from a shopping cart webpage to the checkout webpage, and if any information is missing, a shopper can enter the missing information to the checkout webpage. The items displayed in the checkout webpage are now referred to as ordered items.

In step 470, a procurement system monitors displaying ordered items in a checkout webpage of an e-commerce website. The checkout process at the e-commerce site is dependent on the e-commerce website provider. Some of the common elements like the shipping address, login information and more can be provided by the procurement system. Other information, such as the shopper information can be entered by the shopper. For example, the shopper can enter required payment information such as credit card information, or account information.

In step 480, a procurement system monitors placing a purchase order. For example, once a shopper finished entering information to a checkout webpage of an e-commerce website, the shopper can submit a purchase order to the e-commerce website. In response to receiving the purchase order, the e-commerce website can send a confirmation number associated with the purchase order.

In an embodiment, a confirmation number associated with a purchase order can sent to a procurement system. For example, a shopper can copy the confirmation number and paste it into a top frame of the browser which can cause sending the order confirmation number to the procurement system. The order confirmation number can be useful to track the order in the future.

6.0 Examples of Tabs Implemented in a Business Procurement Application

FIG. 5-9 illustrate various embodiments of enabling e-commerce shopping within a business procurement application.

Figure 5:
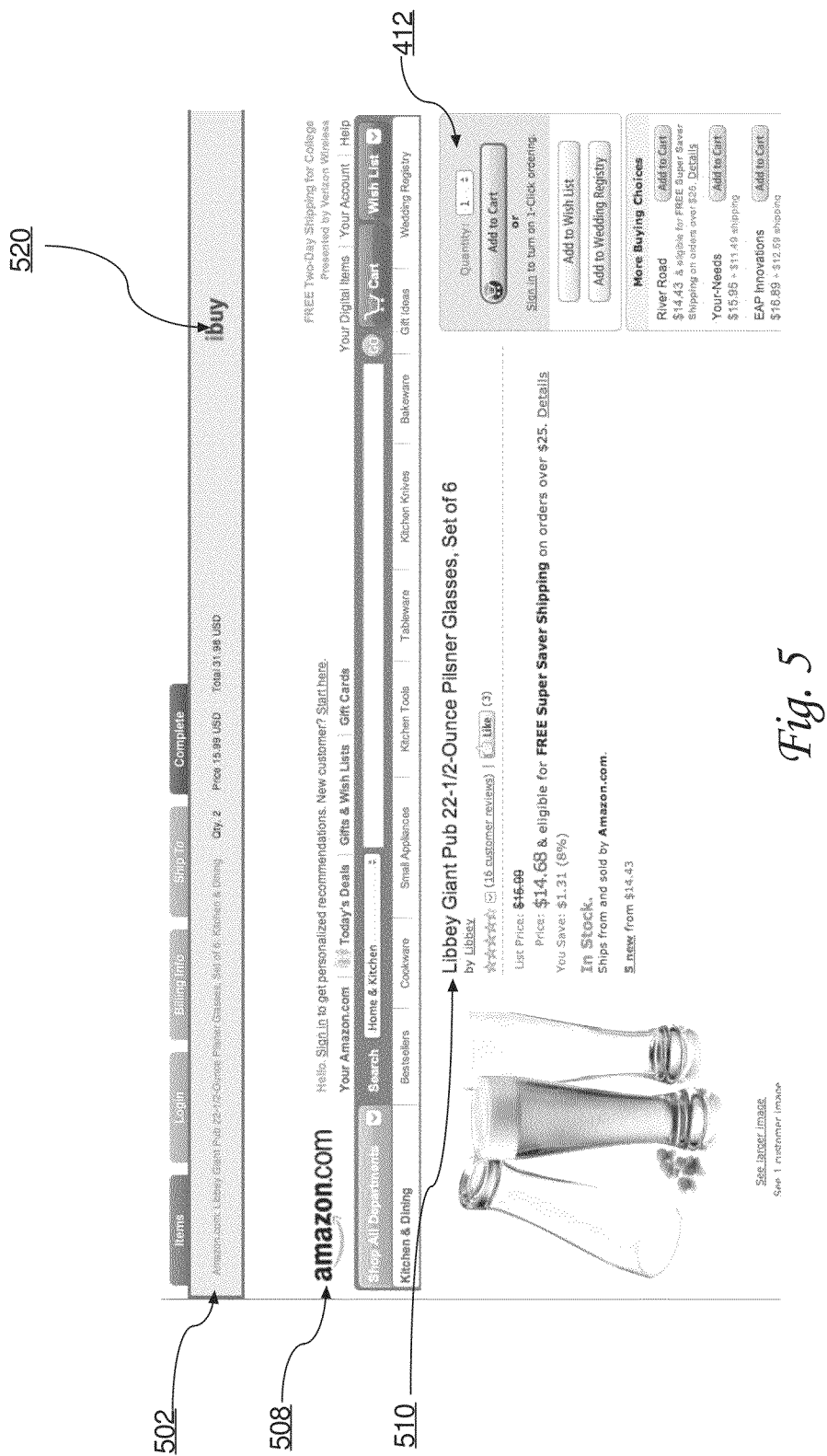
FIG. 5 illustrates an embodiment of enabling e-commerce shopping within a business procurement application.

FIG. 5 illustrates an embodiment of enabling e-commerce shopping within a business procurement application. In particular, FIG. 5 depicts e-commerce shopping from an e-commerce webpage. As a shopper was navigating an e-commerce website 508, the shopper found a set of glasses 510, that he would like to purchase. The shopper identified the quantity of the sets 412.

In an embodiment, as a shopper navigates an e-commerce website 508, the shopper can select a bookrmarklet 520, displayed in the shopper's browser. The bookmarklet 520 is displayed in a browser bookmark tab 504. Details about a bookmarklet are provided above.

Figure 6:
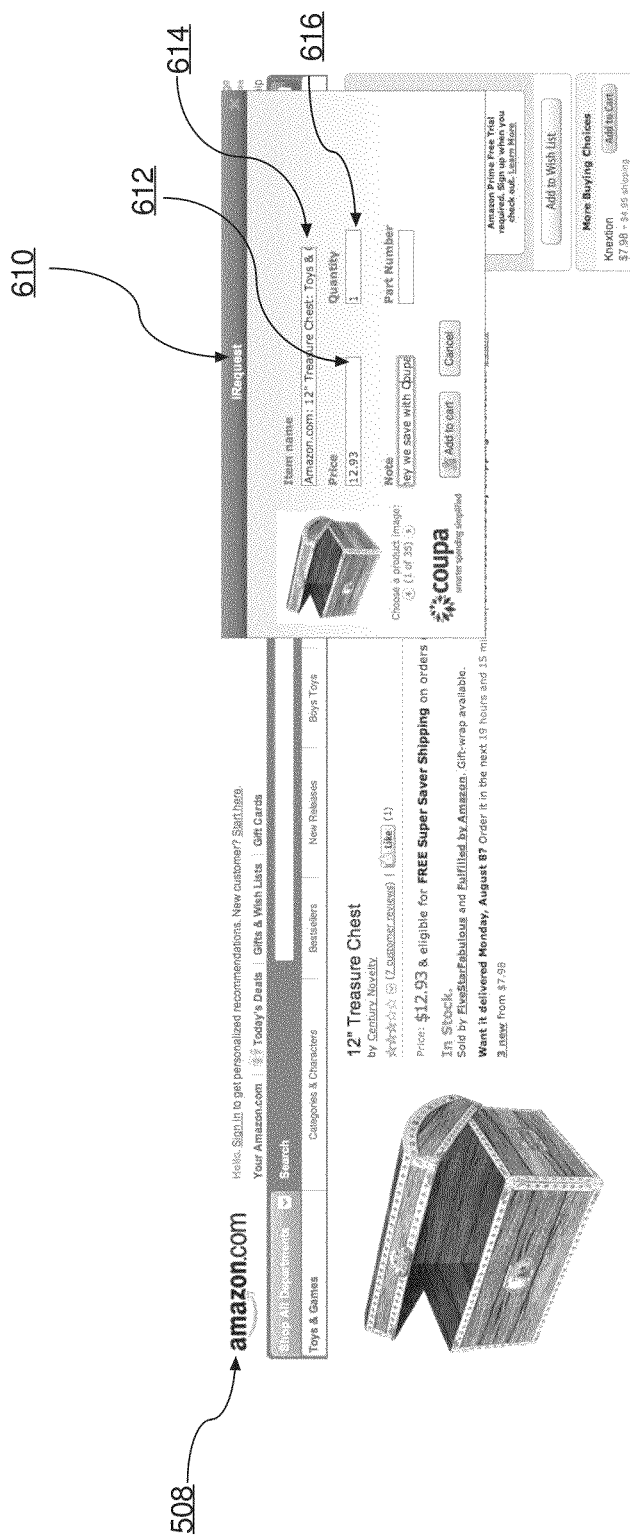
FIG. 6 illustrates an embodiment of enabling e-commerce shopping within a business procurement application.

In an embodiment, selecting a bookmarklet can caused opening a new window, associated with a procurement application, as described in FIG. 6.

FIG. 6 illustrates an embodiment of enabling e-commerce shopping within a business procurement application. In particular, FIG. 6 depicts two overlapping windows. One window is an e-commerce website webpage 508, described above; another web page is a procurement application window 610. The procurement application window 610 displays the information gathered about items displayed on the web page 508.

In an embodiment, information gathered about the items displayed on the web page 508 can be gathered automatically from the e-commerce site and automatically displayed in the window 610. This can be accomplished by executing a bookmarklet, described above. For example, execution of the bookmarklet can cause filling out an item name field 614, a price field 612, a quantity field 616, and other fields. A shopper can modify or add additional information to the window 610, and as the shopper does that, the additional information can be transferred to storage associated with a procurement system.

Figure 7:
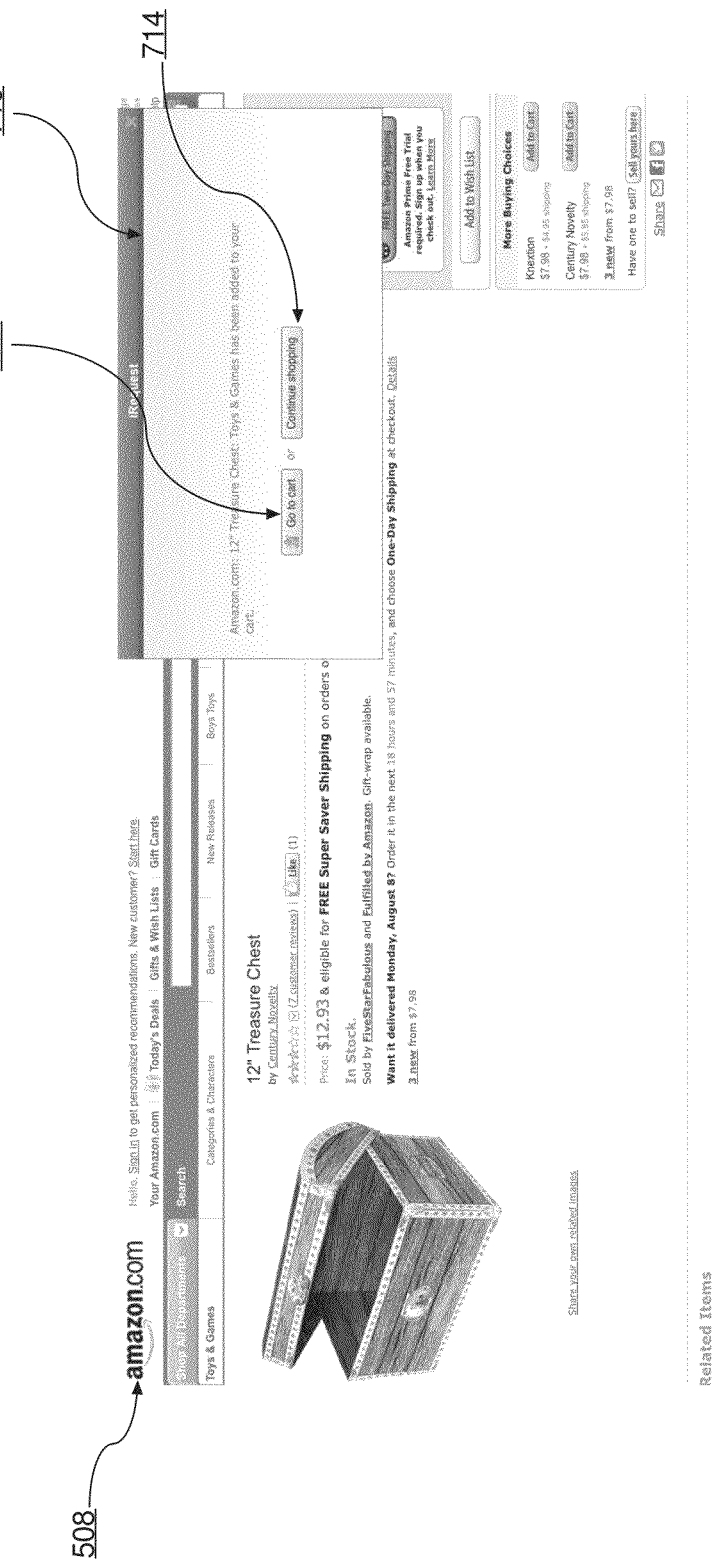
FIG. 7 illustrates an embodiment of enabling e-commerce shopping within a business procurement application.

FIG. 7 illustrates an embodiment of enabling e-commerce shopping within a business procurement application. In particular, FIG. 7 depicts two overlapping windows. One window is an e-commerce website web page 508, described above; another window is a procurement application window 710. The procurement application window 710 displays two links presented in separate text boxes: one text box provides a hyperlink labeled as "Go to cart" 712; another text box provides a hyperlink labeled as "Continue shopping" 714.

In an embodiment, a shopper has a choice to either select a "Go to cart" link 712, or to select a "Continue shopping" 714. If the shopper selects the "Go to cart" link 712, then a shopper is redirected to a shopping cart web page 800 depicted in FIG. 8, described below.

However, if a shopper selects a "Continue shopping" link 714, then a shopper is redirected back to a web page 508 of an e-commerce website, and the shopper can continue shopping from a webpage 508 of the e-commerce website. Furthermore, the shopper can launch another webpage of another e-commerce website and continue shopping using another e-commerce seller.

Figure 8:
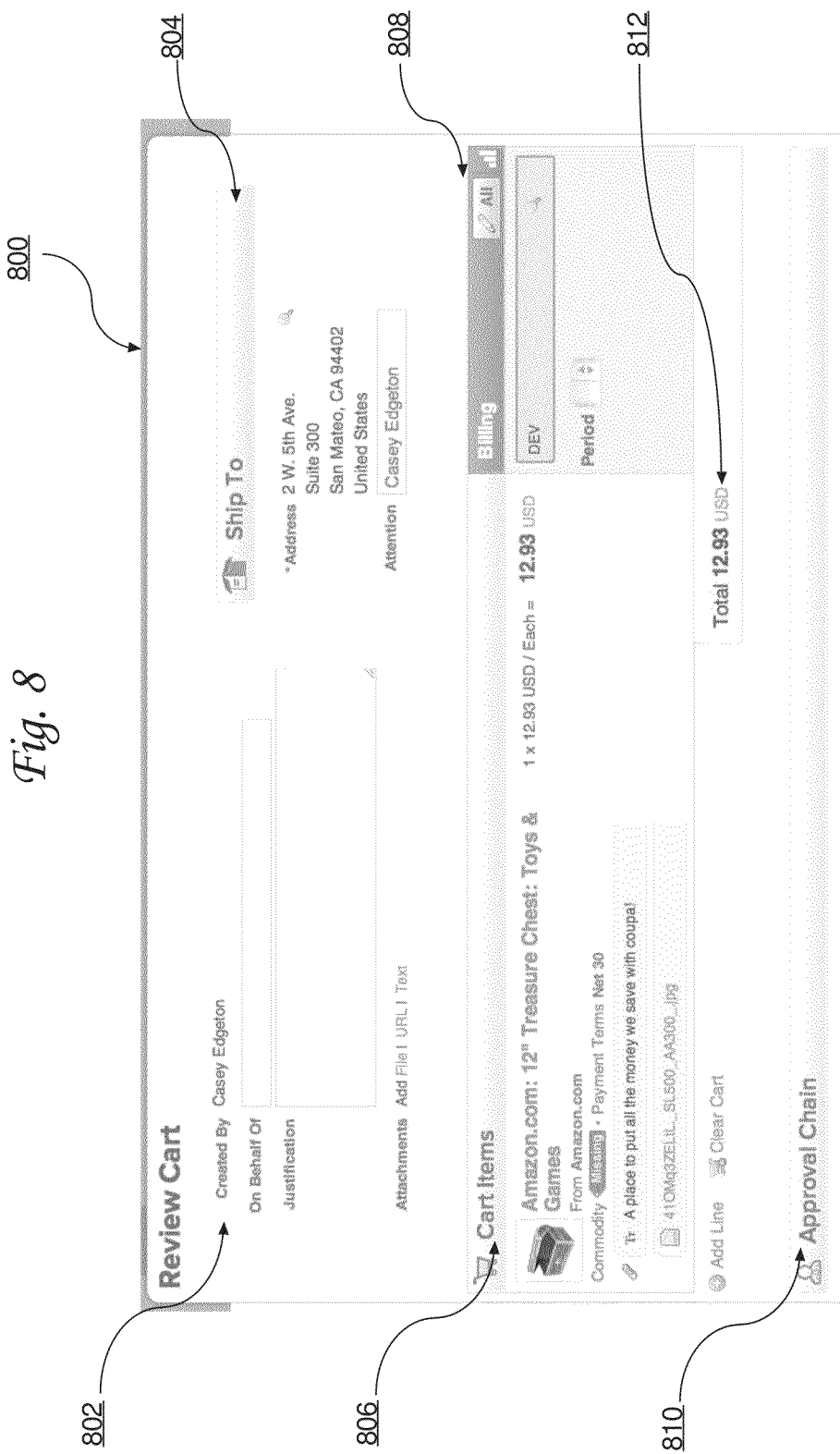
FIG. 8 illustrates an embodiment of enabling e-commerce shopping within a business procurement application.

FIG. 8 illustrates an embodiment of enabling e-commerce shopping within a business procurement application. In particular, FIG. 8 depicts a review cart web page 800 generated by a procurement application. A shopper can request that the review cart web page be displayed by selecting a "Go to cart" link, as described in FIG. 8.

In an embodiment, a review cart web page 800 displays various types of information. For example, the review cart web page 800 can comprise detailed information 806 about an item that is being requested, information about a requester 802, shipping information 804 for the requested item, billing information 808 for purchasing the requested item, a total cost 812 of the requested item and information about an approval chain 810 of individuals who are designated to make a decision whether a purchase of the requested item can be authorized.

Figure 9:
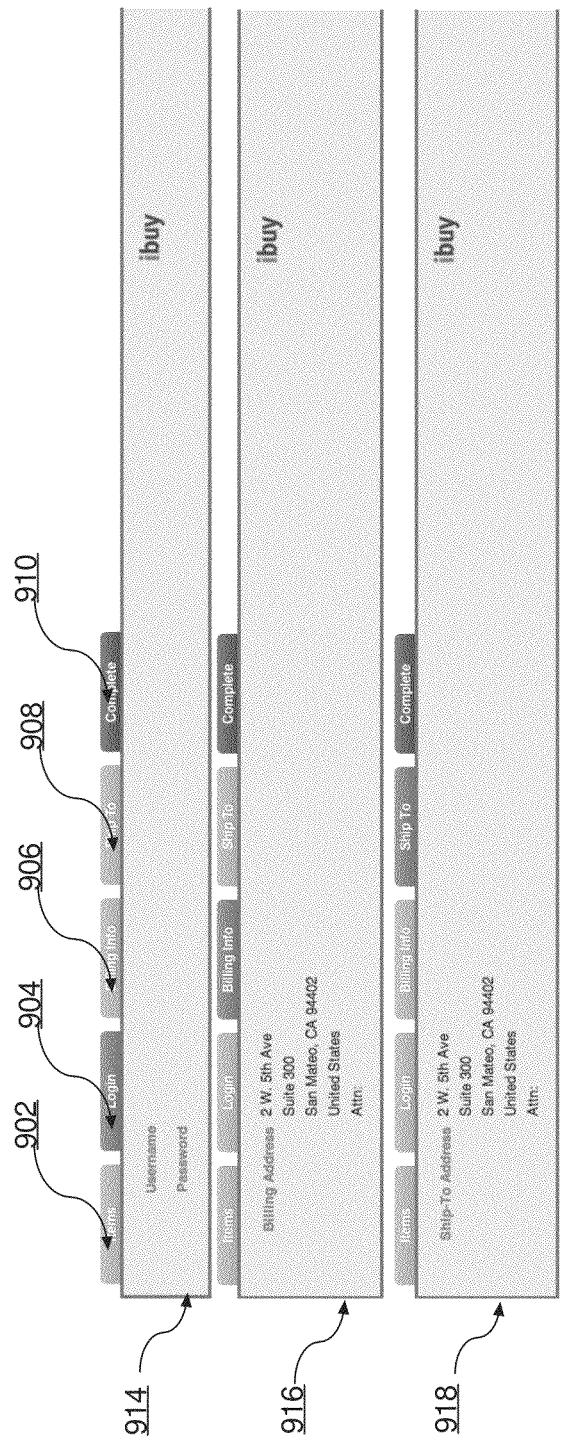
FIG. 9 illustrates an embodiment of enabling e-commerce shopping within a business procurement application.

FIG. 9 illustrates embodiments of various tabs generated by a business procurement application. In particular, FIG. 9 depicts an "Items" tab 902, a "Login" tab 904, a Billing Info" tab 906, a "Ship To" tab 908, and a "Complete" tab 910. The tabs allow navigating via different interfaces implemented in the business procurement application. The Items" tab 902 allows displaying requested items, the "Login" tab 904 allows accessing the procurement system, a Billing Info" tab 906 allows displaying billing information for the requested items, a "Ship To" tab 908 allows displaying shipping information for the requested items, and a "Complete" tab 910 allows completing the ordering process.

In an embodiment, if a "Login" tab 914 is selected, a business procurement application displays a "Username" text box and a "Password" text box to prompt a user to enter a username of the user and a password of the user as credentials for the user to gain access to a procurement system.

In an embodiment, if a "Billing Info" tab 916 is selected, a business procurement application displays billing information associated with a particular item that has been requested to be purchased. For example, the procurement application can display the billing address of the entity responsible for the payment, a name of the responsible individual and other information.

In an embodiment, if a "Ship To" tab 918 is selected, a business procurement application displays shipping information associated with a particular item that has been requested to be purchased. For example, the procurement application can display the shipping address to which the requested item should be shipped if the purchase of the requested item is indeed approved.

Benefits of the presented approach include, without limitation, the ability to seamlessly interface a process of ordering items from any e-commerce site with a pre-authorization process required by a corporate management. Implementation of the pre-authorization of a purchase request prior to actual ordering of the items ensures the proper controls and procedures necessary in a business procurement system. Furthermore, the approach simplifies the method the items are ordered. For example, a shopper does not need to retype the same information about the requested items. The approach streamlines the process of buying the requested items from the e-commerce site by guiding the shopper through the appropriate purchasing process.

7.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
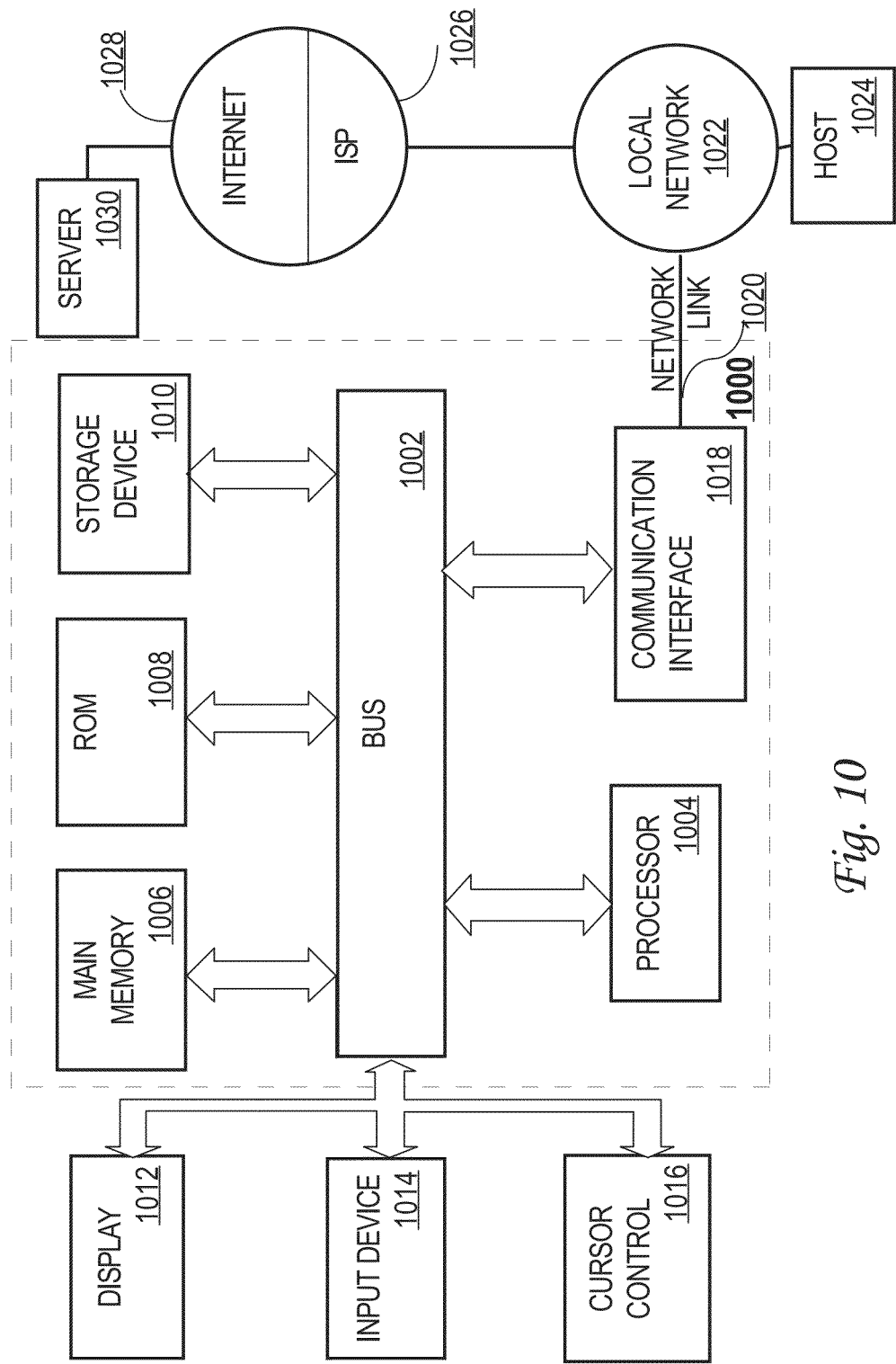
FIG. 10 illustrates a computer system with which embodiments may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (LCD, CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A data processing method, comprising:
   sending, by a procurement computer to a client computer, a message indicating that a pre-authorization request for one or more requested items requested by the client computer from an e-commerce website was approved;
   causing displaying, by the procurement computer on the client computer, a particular item, from the one or more requested items, as approved for purchase from the e-commerce website;
   causing launching, by the procurement computer on the client computer, a web browser and causing downloading a shopping cart webpage of the e-commerce website;
   sending, by the procurement computer to the shopping cart webpage of the e-commerce website, item information associated with the particular item, and causing displaying the item information on the shopping cart webpage as one of one or more ordered items;
   in response to determining that a user requested to proceed to a checkout webpage of the e-commerce website, causing downloading, by the procurement computer, the checkout webpage of the e-commerce website and causing displaying the one or more ordered items on the checkout webpage;
   causing placing a purchase order for the one or more ordered items from the checkout webpage of the e-commerce website.

2. The method of claim 1, wherein the message indicating that a pre-authorization request for one or more requested items from an e-commerce website was approved is sent by the procurement computer in response to receiving a pre-authorization request confirmation indicating that the purchase of the one or more requested items was reviewed and approved by authorized personnel.

3. The method of claim 2, wherein the item information associated with the particular item comprises one or more of: a name of the particular item, a quantity of the particular item to be purchased, one or more specific attributes associated with the particular item, billing information for the particular item; shipping information for the particular item, and user login information.

4. The method of claim 3, further comprising receiving an order confirmation once the purchase order for the one or more ordered items was successfully processed by the e-commerce website.

5. The method of claim 4, further comprising collecting and storing, in storage, data about the pre-authorization request, an approval of the pre-authorization request, the one or more requested items, the purchase order, and a purchase order confirmation.

6. A data processing apparatus, comprising:
   one or more processors;
   a procurement unit coupled to the one or more processors and configured to:
      send, by a procurement computer to a client computer, a message indicating that a pre-authorization request for one or more requested items requested by the client computer from an e-commerce website was approved;
      cause displaying, by the procurement computer on the client computer, a particular item, from the one or more requested items, as approved for purchase from the e-commerce website;
   a web browser unit coupled to the one or more processors and configured to:
      cause launching, by the procurement computer on the client computer a web browser and causing downloading a shopping cart webpage of the e-commerce website;
   a bookmarklet unit coupled to the one or more processors and configured to:
      send, by the procurement computer to the shopping cart webpage of the e-commerce website, item information associated with the particular item, and causing displaying the item information on the shopping cart webpage as one of one or more ordered items;
      in response to determining that a user requested to proceed to a checkout webpage of the e-commerce website, cause downloading, by the procurement computer, the checkout webpage of the e-commerce website and causing displaying the one or more ordered items on the checkout webpage;
      cause placing a purchase order for the one or more ordered items from the checkout webpage of the e-commerce website.

7. The data processing apparatus of claim 6, wherein the message indicating that a pre-authorization request for one or more requested items from an e-commerce website was approved is sent by the procurement computer in response to receiving a pre-authorization request confirmation indicating that the purchase of the one or more requested items was reviewed and approved by authorized personnel.

8. The data processing apparatus of claim 7, wherein the item information associated with the particular item comprises one or more of: a name of the particular item, a quantity of the particular item to be purchased, one or more specific attributes associated with the particular item, billing information for the particular item; shipping information for the particular item, and user login information.

9. The data processing apparatus of claim 8, wherein the procurement unit is further configured to receive an order confirmation once the purchase order for the one or more ordered items was successfully processed by the e-commerce website.

10. The data processing apparatus of claim 9, wherein the procurement unit is further configured to collect and store, in storage, data about the pre-authorization request, an approval of the pre-authorization request, the one or more requested items, the purchase order, and a purchase order confirmation.

11. A non-transitory computer-readable storage medium storing one or more sequences of instructions which, when executed by one or more processors, cause the one or more processors to perform:
   sending, by a procurement computer to a client computer, a message indicating that a pre-authorization request for one or more requested items requested by the client computer from an e-commerce website was approved;
   causing displaying, by the procurement computer on the client computer, a particular item, from the one or more requested items, as approved for purchase from the e-commerce website;
   causing launching, by the procurement computer on the client computer, a web browser and causing downloading a shopping cart webpage of the e-commerce website;
   sending, by the procurement computer to the shopping cart webpage of the e-commerce website, item information associated with the particular item, and causing displaying the item information on the shopping cart webpage as one of one or more ordered items;
   in response to determining that a user requested to proceed to a checkout webpage of the e-commerce website, causing downloading, by the procurement computer, the checkout webpage of the e-commerce website and causing displaying the one or more ordered items on the checkout webpage;
   causing placing a purchase order for the one or more ordered items from the checkout webpage of the e-commerce website.

12. The non-transitory computer-readable storage medium of claim 11, wherein the message indicating that a pre-authorization request for one or more requested items from an e-commerce website was approved is sent by the procurement computer in response to receiving a pre-authorization request confirmation indicating that the purchase of the one or more requested items was reviewed and approved by authorized personnel.

13. The non-transitory computer-readable storage medium of claim 12, wherein the item information associated with the particular item comprises one or more of: a name of the particular item, a quantity of the particular item to be purchased, one or more specific attributes associated with the particular item, billing information for the particular item; shipping information for the particular item, and user login information.

14. The non-transitory computer-readable storage medium of claim 13, further storing instructions which, when executed by the one or more processors, cause the one or more processors to perform: receiving an order confirmation once the purchase order for the one or more ordered items was successfully processed by the e-commerce website.

15. The non-transitory computer-readable storage medium of claim 14, further storing instructions which, when executed by the one or more processors, cause the one or more processors to perform: collecting and storing, in storage, data about the pre-authorization request, an approval of the pre-authorization request, the one or more requested items, the purchase order, and a purchase order confirmation.

* * * * *